United States Patent
Deora et al.

(10) Patent No.: US 11,487,839 B2
(45) Date of Patent: Nov. 1, 2022

(54) RESOURCE LINK ENGINE

(71) Applicant: CITRIX SYSTEMS, INC., Fort Lauderdale, FL (US)

(72) Inventors: Divyansh Deora, Jaipur (IN); Arnav Akhoury, Jamshedpur (IN); Nandikotkur Achyuth, Hyderabad (IN); Satish Vanahalli, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/087,304

(22) Filed: Nov. 2, 2020

(65) Prior Publication Data
US 2022/0121722 A1   Apr. 21, 2022
US 2022/0245216 A9   Aug. 4, 2022

(30) Foreign Application Priority Data

Oct. 12, 2020   (IN) .............................. 202011044337

(51) Int. Cl.
*G06F 15/173* (2006.01)
*G06F 16/955* (2019.01)
*H04L 51/08* (2022.01)
*G06F 16/9535* (2019.01)
(Continued)

(52) U.S. Cl.
CPC ...... *G06F 16/9558* (2019.01); *G06F 16/9535* (2019.01); *G06F 40/205* (2020.01); *H04L 51/08* (2013.01); *H04L 67/02* (2013.01)

(58) Field of Classification Search
None
See application file for complete search history.

(56) References Cited

U.S. PATENT DOCUMENTS

2012/0124073 A1* 5/2012 Gross .................... G06F 16/954
707/767
2012/0278164 A1* 11/2012 Spivack ............... G06F 16/951
705/14.52
(Continued)

FOREIGN PATENT DOCUMENTS

EP    2375351 A1   10/2011

OTHER PUBLICATIONS

International Search Report and Written Opinion issued for PCT/US2021/053507, dated Jan. 18, 2022. (12 pages).

*Primary Examiner* — Phuoc H Nguyen
(74) *Attorney, Agent, or Firm* — Mintz Levin Cohn Ferris Glovsky and Popeo, P.C.

(57) ABSTRACT

A resource link engine may aggregate, from one or more communication services, data including a plurality of messages exchanged between a plurality of users. The resource link engine may compute, for each resource link included in the plurality of messages, a first relevance score of the resource link for a user and/or a second relevance score of the resource link for a group of users including the user. The resource link engine may identify, based on the first relevance score and/or the second relevance score, one or more resource links relevant to the user. In response to detecting the user interacting with a browser at a device, the resource link engine may provide, to the device, the resource links identified as being relevant to the user. Related systems, methods, and articles of manufacture, including computer program products, are provided.

20 Claims, 8 Drawing Sheets

(51) Int. Cl.
*G06F 40/205* (2020.01)
*H04L 67/02* (2022.01)

(56) References Cited

U.S. PATENT DOCUMENTS

| | | | |
|---|---|---|---|
| 2015/0220836 A1* | 8/2015 | Wilson | H04L 67/18 706/46 |
| 2015/0289120 A1* | 10/2015 | Harber | G06Q 50/01 455/414.3 |
| 2017/0060872 A1* | 3/2017 | Sacheti | G06N 20/00 |
| 2017/0177589 A1* | 6/2017 | Shorman | G06Q 50/01 |
| 2018/0005293 A1* | 1/2018 | Adams | G06F 16/90335 |
| 2018/0007100 A1* | 1/2018 | Krasadakis | G06Q 10/1095 |
| 2020/0242669 A1* | 7/2020 | Carroll | G06Q 30/0279 |

* cited by examiner

RESOURCE LINK ENGINE

CROSS REFERENCE TO RELATED APPLICATIONS

This application claims priority to Indian Patent Application No. 202011044337, filed Oct. 12, 2020 and entitled "RESOURCE LINK ENGINE," the contents of which are hereby incorporated by reference in their entirety.

TECHNICAL FIELD

The subject matter described herein relates generally to computing environments and communication technologies and more specifically to sharing resource links.

BACKGROUND

A resource link may provide access to a web resource by at least specifying a location of the web resource on a computer network and a mechanism for retrieving the web resource. The resource link may provide access to a variety of resources including, for example, webpages, computer programs, multimedia files, electronic documents, and/or the like. Moreover, the resource may be referenced by a hyperlink. In order for a client to access a web resource, a browser at the client may retrieve, based on the corresponding resource link, the web resource from a remote server hosting the web resource.

SUMMARY

Systems, methods, and articles of manufacture, including computer program items, are provided for providing relevant resource links. In one aspect, there is provided a system. The system may include at least one data processor and at least one memory. The at least one memory may store instructions which, when executed by the at least one data processor cause the at least one data processor to at least: aggregate, from one or more communication services, data including a plurality of messages exchanged between a plurality of users including a first user and a second user; compute, for a first link to a first resource included in a first message exchanged between the first user and the second user, a first relevance score of the first link for the first user; identify, based at least on the first resource score, the first link as one or more links relevant to the first user; and in response to detecting the first user interacting with a browser at a first device, provide, to the first device, the one or more links relevant to the first user.

In some variations, one or more features disclosed herein including the following features can optionally be included in any feasible combination. For a second link to a second resource included in a second message exchanged with a third user, a second relevance score may be computed for a group of users including the first user and the third user. The second link may be identified as the one or more links relevant to the first user based at least on the second relevance core.

In some variations, the first user and the third user may be determined to belong to a same group of users based on one or more common attributes including an interest, a project, a job title, and/or an organizational assignment.

In some variations, the plurality of messages may be sorted into one or more buckets of messages based at least on a time, a sender, a recipient, and/or a sender.

In some variations, the first relevance score of the first link may be computed based at least on a time of the first message including the first link.

In some variations, a natural language processing may be performed to at least determine a tone, a sentiment, a topic, and/or an intent of the first message. The first relevance score of the first link included in the first message may be computed based at least on a result of the natural language processing.

In some variations, the natural language processing may include a parts-of-speech tagging to determine an urgency of the first message.

In some variations, a profile of the first user may be updated, based at least on the first relevance score of the first link, to include the first link. The profile of the first user may be accessed in order to identify the one or more links relevant to the first user.

In some variations, the profile of the first user may be stored at a database accessible to the first device and a second device associated with the first user.

In some variations, at least a portion of the profile retrieved from the database may be cached at the first device. The one or more links relevant to the first user may be identified based at least on the portion of the profile cached at the first device.

In some variations, the one or more links relevant to the first user may be provided to the first device in response to the first user interacting with the browser at the first device to input a link to a resource.

In some variations, the one or more links relevant to the first user may be provided to the first device in response to the first user interacting with the browser at the first device to view a content. The one or more links relevant to the first user may be further identified based at least on the content.

In some variations, the first link may be a hyperlink and/or a network path.

In some variations, the plurality of messages may include one or more emails, instant messages, and/or issue tracking tickets.

In another aspect, there is provided a system. The system may include at least one data processor and at least one memory. The at least one memory may store instructions which, when executed by the at least one data processor cause the at least one data processor to at least: compute a score for a link to a resource, the link being included in an exchange of messages that forms a conversation between a plurality of users of an application, and computation of the score including grouping of messages that occur before or after the link within the conversation to determine a portion of the conversation for which the link belongs; determine that the link is part of a recent portion of the conversation based on the computed score; and provide the link to a client device so as to avoid delays with search of the messages of the conversation to located the link and access the resource.

In another aspect, there is provided a method for providing relevant resource links. The method may include: aggregating, from one or more communication services, data including a plurality of messages exchanged between a plurality of users including a first user and a second user; computing, for a first link to a first resource included in a first message exchanged between the first user and the second user, a first relevance score of the first link for the first user; identifying, based at least on the first resource score, the first link as one or more links relevant to the first user; and in response to detecting the first user interacting with a browser at a first device, providing, to the first device, the one or more links relevant to the first user.

In some variations, one or more features disclosed herein including the following features can optionally be included in any feasible combination. The method may further include: computing, for a second link to a second resource included in a second message exchanged with a third user, a second relevance score of the second link for a group of users including the first user and the third user, the first user and the third user belonging to a same group of users based on one or more common attributes including an interest, a project, a job title, and/or an organizational assignment; and identifying, based at least on the second relevance core, the second link as the one or more links relevant to the first user.

In some variations, the method may further include sorting, based at least on a time, a sender, a recipient, and/or a sender, the plurality of messages into one or more buckets of messages.

In some variations, the first relevance score of the first link may be computed based at least on a time of the first message including the first link.

In some variations, the method may further include: performing a natural language processing to at least determine a tone, a sentiment, a topic, and/or an intent of the first message, and computing, based at least on a result of the natural language processing, the first relevance score of the first link included in the first message.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing relevant resource links, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
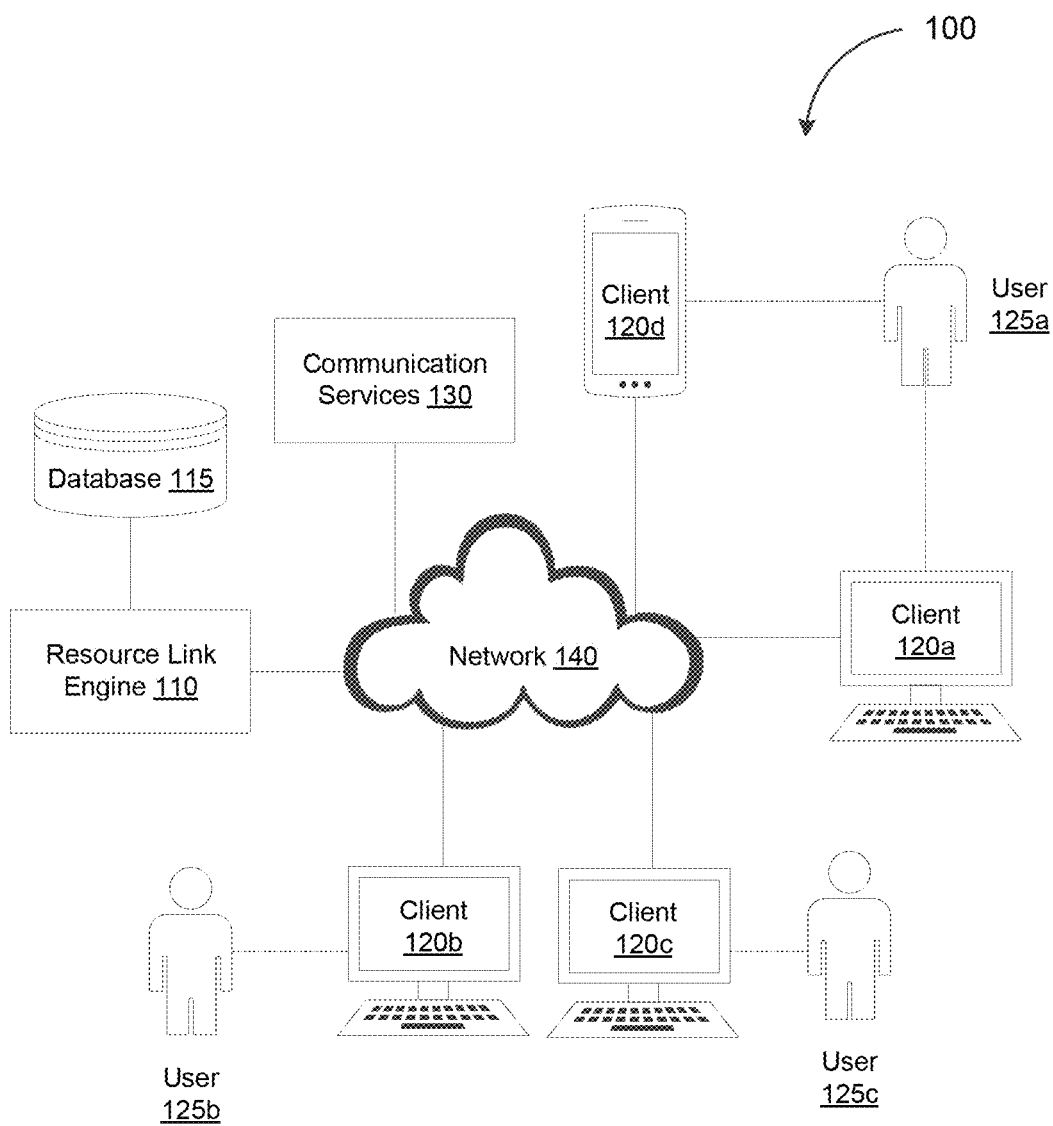
FIG. 1 depicts a system diagram illustrating an example of a resource link system, in accordance with some example embodiments.

A web resource, such as a webpage, a computer program, a multimedia file, and/or an electronic document, may be accessed based on a corresponding reference or hyperlink (e.g., hereinafter generally referred to as a link, such as a resource link) specifying a location of data (e.g., the web resource) on a computer network and a mechanism for retrieving that data (e.g., the web resource). Correspondences between two or more users may include one or more resource links. For example, a first user may receive, from a second user, a message (e.g., an email, an instant message, an issue tracking ticket, and/or the like) including a resource link to a web resource. However, the first user may lose track of the message containing the resource link (e.g., the message may be one of several messages of a conversation or other message exchange) and thus lose the ability to readily access the corresponding web resource. Moreover, the first user may receive many resource links in various messages but not all of the received resource links may be relevant to the first user. To retrieve a resource link, especially a resource link that is relevant to the first user, may therefore require sorting through many messages, a task that is time consuming as well as inconvenient.

In some example embodiments, to provide immediate and efficient access to relevant resource links, a resource link engine may track the resource links included in correspondences between various users. The resource link engine may further analyze the correspondences in order identify resource links relevant to individual users. For example, the resource link engine may track the resource links included in one or more messages exchanged between the first user and the second user. The resource link engine may further identify, based at least on a time and/or an urgency of each message, one or more resource links that are relevant to the first user. When the first user interacts with a browser at one or more devices associated with the first user, the resource link engine may provide, to one or more devices, the resource links that are relevant to the first user. Relevant resource links included in the messages exchanged between the first user and the second user may be provided to the first user instead of and/or in addition to resource links included in a browsing history of the first user. For instance, relevant resource links may refer to resource links included in more recent and/or urgent messages exchanged between the first user and the second user.

In some example embodiments, the resource link engine may track the resource links across multiple devices. For example, the resource link engine may track resource links in one or more messages the first user received on a first device as well as a second device in order to provide, to the first device and/or the second device, resource links relevant to the first user in response to the first user conversing or otherwise exchanging messages (e.g., via interactions with a browser) with another via user of the first device and/or the second device. Alternatively and/or additionally, the resource link engine may track resource links across groups of users. For instance, in addition to the resource links included in the messages exchanged between the first user and the second user, the resource link engine may also track resource links in messages associated with a third user who is in a same group as the first user and/or the second user. As such, the resource link engine may provide, to one or more devices of the first user, resource links identified as relevant to the third user.

In some example embodiments, the resource link engine may compute, based at least on a time of the correspondences between various users, a score (e.g., a relevance score) for individual the resource links included in the correspondences. Alternatively and/or additionally, the resource link engine may perform semantic analysis on the correspondences between various users in order to compute a relevance score for each resource link included in the correspondences. For example, the resource link engine may perform natural language processing (e.g., parts-of-speech (POS) tagging and/or the like) to determine a tone, a sentiment, a topic, and/or an intent associated with one or more messages exchanged between the first user and the second user. The relevance score of a resource link included in a message may be determined based at least on a result of the semantic analysis including, for example, a tone, a sentiment, a topic, and/or an intent associated with the message. For instance, the relevance score for the resource link may be higher (or lower) if the result of the semantic analysis indicates more (or less) urgency in the message including the resource link. The resource link engine may provide, to one or more devices of the first user, one or more resource links having a highest relevance score and/or a relevance score exceeding a threshold (e.g., a particular value).

In some example embodiments, the resource link engine may compute, for individual resource links, a relevance score for one or more individual users as well as a relevance score for one or more groups of users. For example, the resource link engine may compute, for a resource link included in a message exchanged between the first user and the second user, a first relevance score of the resource link for the first user. Alternatively and/or additionally, the resource link engine may compute a second relevance score of the resource link for a group of users that includes the first user. The resource links that are provided to the first user may be identified based on the relevance scores of the resource links for the first user as well as groups of users including the first user.

In some example embodiments, the resource link engine may provide, to one or more devices of the first user, resource links relevant to the first user to in response to detecting the first user interacting with a browser at the one or more devices. For example, the resource links that are relevant to the first user may be displayed at one or more devices of the first user in response to the first user interacting with a browser at the one or more devices to input a resource link. Alternatively and/or additionally, the resource links that are relevant to the first user may be displayed at one or more devices of the first user in response to the first user interacting with the one or more devices to view content (e.g., via a browser to view a webpage and/or the like). The resource links that are displayed in response to the first user viewing content may be further identified based on the content.

FIG. 1 depicts a system diagram illustrating an example of a system to identify and/or provide references (or links) to data, such as computing or web resources, in accordance with some example embodiments. Referring to FIG. 1, the system 100 may include a resource link engine 110, one or more communication services 130, a first client 120*a*, a second client 120*b*, a third client 120*c*, and a fourth client 120*d*. The resource link engine 110, the one or more communication services 130, the first client 120*a*, the second client 120*b*, the third client 120*c*, and the fourth client 120*d* may be communicatively coupled via a network 140. The network 140 may be a wired network and/or a wireless network including, for example, a local area network (LAN), a virtual local area network (VLAN), a wide area network (WAN), a public land mobile network (PLMN), the Internet, and/or the like. The first client 120*a*, the second client 120*b*, the third client 120*c*, and the fourth client 120*d* may be processor-based devices including, for example, a smartphone, a tablet computer, a wearable apparatus, a laptop computer, a desktop computer, a workstation, and/or the like.

Referring to again to FIG. 1, the resource link engine 110 may monitor or otherwise track the resource links included in correspondence(s) between various users including, for example, a first user 125*a* at the first client 120*a*, a second user 125*b* at the second client 120*b*, and a third user 125*c* at the third client 120*c*. For example, the first user 125*a* at the first client 120*a*, the second user 125*b* at the second client 120*b*, and the third user 125*c* at the third client 120*c* may exchange, via the one or more communication services 130, one or more messages (e.g., emails, instant messages, issue tracking tickets, and/or the like) including one or more resource links (e.g., hyperlinks, network paths, and/or the like). The one or more communication services 130 may include an email server, an instant message service, an issue tracking system, and/or the like.

The resource link engine 110 may aggregate, from the one or more communications services 130, the one or more messages exchanged between the first user 125*a* at the first client 120*a*, the second user 125*b* at the second client 120*b*, and the third user 125*c* at the third client 120*c*. For examples, the messages may be aggregated by the resource link engine 110 interacting with the one or more communication services 130 via one or more application programming interface (API) calls, web hooks, and/or the like. Alternatively and/or additionally, the one or more communication services 130 may publish and/or push, to the resource link engine 110, the messages for aggregation by the resource link engine 110.

In some example embodiments, the resource link engine 110 may be configured to identify resource links relevant to the first user 125a. For example, the resource link engine 110 may identify, based at least on the resource links included in one or more messages exchanged between the first user 125a at the first client 120a and the second user 125b at the second client 120b, resource links that are relevant to the first user 125a. The resource link engine 110 may track the resource links across multiple devices including, for example, resource links that are included in messages sent from and/or received at the first client 120a as well as a fourth client 120d of the first user 125a. For instance, the messages the resource link engine 110 aggregates from the one or more communication services 130 may include messages the first user 125a sent from and/or received at the first client 120a and the fourth client 120d. By analyzing the messages the first user 125a sent from and/or received at the first client 120a and the fourth client 120d, the resource link engine 110 may identify relevant resource links included in messages the first user 125a sent from and/or received at the first client 120a as well as the fourth client 120d.

Alternatively and/or additionally, the resource link engine 110 may identify, based at least on the resource links included in one or more messages exchanged with the third user 125a who is in same group as the first user 125a, resource links that are relevant to the first user 125a. It should be appreciated that two or more users, such as the first user 125a and the third user 125c, may belong to a same group of users by having one or more attributes in common including, for example, interests, projects, job title, organizational assignment, and/or the like. Moreover, relevant resource links may be identified based on a relevance score that the resource link engine 110 computes for each resource link included in the messages aggregated from the communication services 130. For example, the resource link engine 110 may compute, for each resource link, a relevance score corresponding to a time and/or an urgency of the message including the resource link.

In some example embodiments, the resource link engine 110 may identify one or more resource links that are relevant to the first user 125a based at least on a score (e.g., a relevance score) of individual resource links included in the messages exchanged with the first user 125a and/or the users in a same group as the first user 125a. Moreover, in response to the first user 125a interacting with a client (e.g., a browser at the first client 120a and/or the fourth client 120d), the resource link engine 110 may provide one or more resource links having a highest relevance score and/or a relevance score exceeding a threshold value to multiple clients (e.g., to the first client 120a and/or the fourth client 120d).

The resource link engine 110 may compute, based at least on a time of the messages, a relevance score for individual resource links included in the messages. Alternatively and/or additionally, the resource link engine 110 may perform semantic analysis on the messages in order to compute a relevance score for resource links included in the messages. For example, the resource link engine 110 may perform natural language processing (e.g., parts-of-speech (POS) tagging and/or the like) to determine a tone, a sentiment, a topic, and/or an intent associated with a message. The relevance score of a resource link included in the message may be determined based at least on a result of the semantic analysis including, for example, a tone, a sentiment, a topic, and/or an intent associated with the message. Accordingly, the relevance score for the resource link may be higher (or lower) if the result of the semantic analysis indicates more (or less) urgency in the message including the resource link.

The resource link engine 110 may compute, for a resource link, a first relevance score of the resource link for the first user 125a. Furthermore, the resource link engine 110 may also compute, for the resource link, a second relevance score of the resource link for a group of users including the first user 125a. Accordingly, the resource link engine 110 may determine, based at least on the first relevance score and/or the second relevance score, whether the resource link is relevant to the first user 125. For example, even when the first relevance score indicates that the resource link is not relevant to the first user 125a individually because the first relevance score fails to exceed a threshold, the resource link engine 110 may nevertheless determine, based at least on the second relevance score exceeding the threshold, that the resource link is relevant to the group of users including the first user 125a. This may occur, for example, when the resource link is absent from recent and/or urgent messages exchanged with the first user 125a but appears in recent and/or urgent messages exchanged with the third user 125c, who belong in a same group as the first user 125a by having one or more attributes in common with the first user 125a.

In some example embodiments, the resource link engine 110 may provide, to the first client 120a and/or the four client 120d of the first user 125a, one or more resource links determined to be relevant to the first user 125a in response to detecting the first user 125a interacting with a client (e.g., a browser at the first client 120a and/or the fourth client 120d). For example, the resource links that are relevant to the first user 125a may be displayed at the first client 120a and/or the fourth client 120d in response to the first user 125a interacting with a browser at the first client 120a and/or the fourth client 120d to input a resource link. Alternatively and/or additionally, the resource links that are relevant to the first user 125a may be displayed at the first client 120a and/or the fourth client 120d in response to the first user 125a interacting with a browser at the first client 120a and/or the fourth client 120d to view content (e.g., a webpage and/or the like). The resource links that are displayed while the first user 125a is viewing content may be further identified based on the content.

Figure 2A:
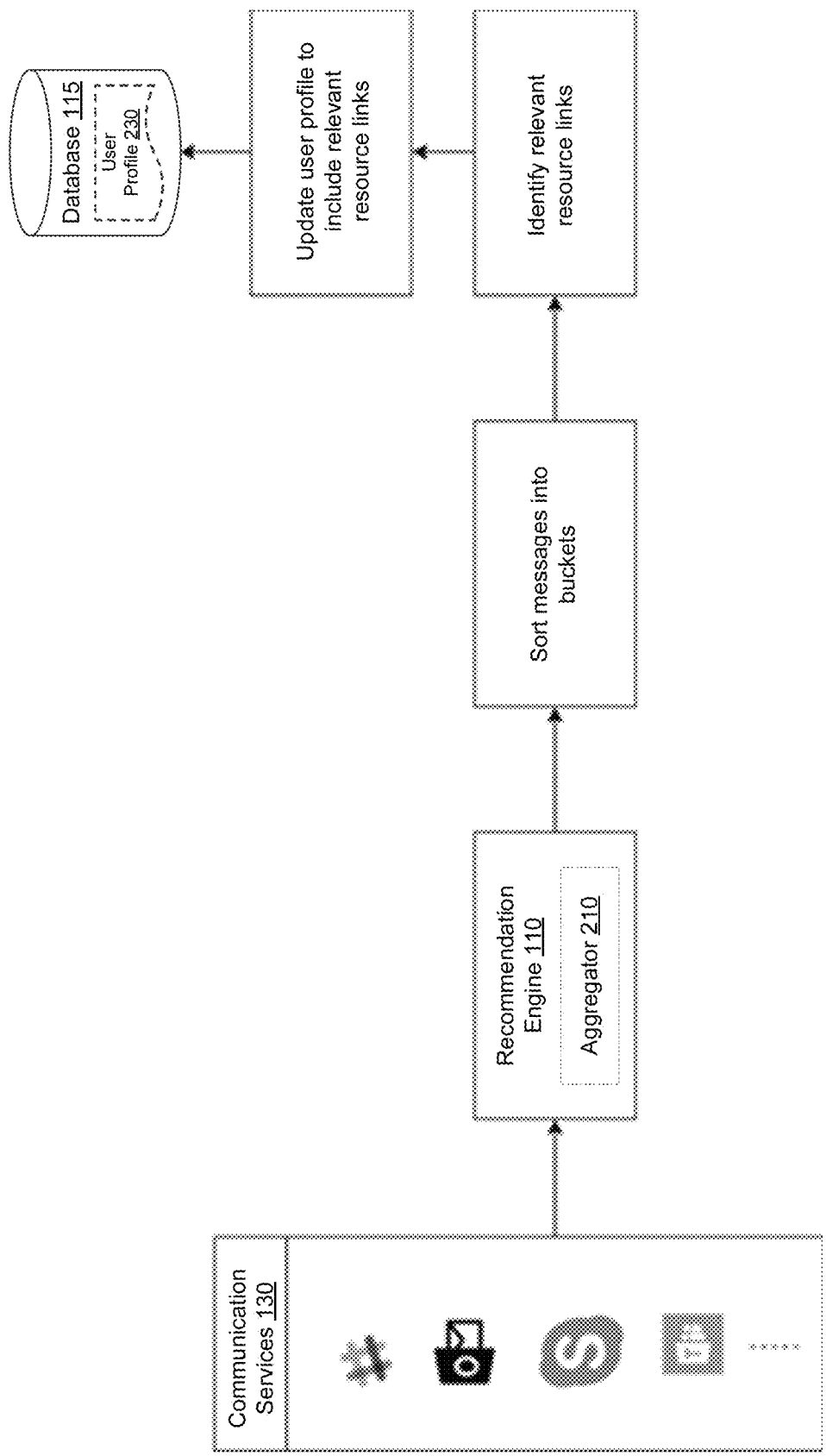
FIG. 2A depicts a block diagram illustrating an example of a flow of data through a resource link system, in accordance with some example embodiments.
Figure 2B:
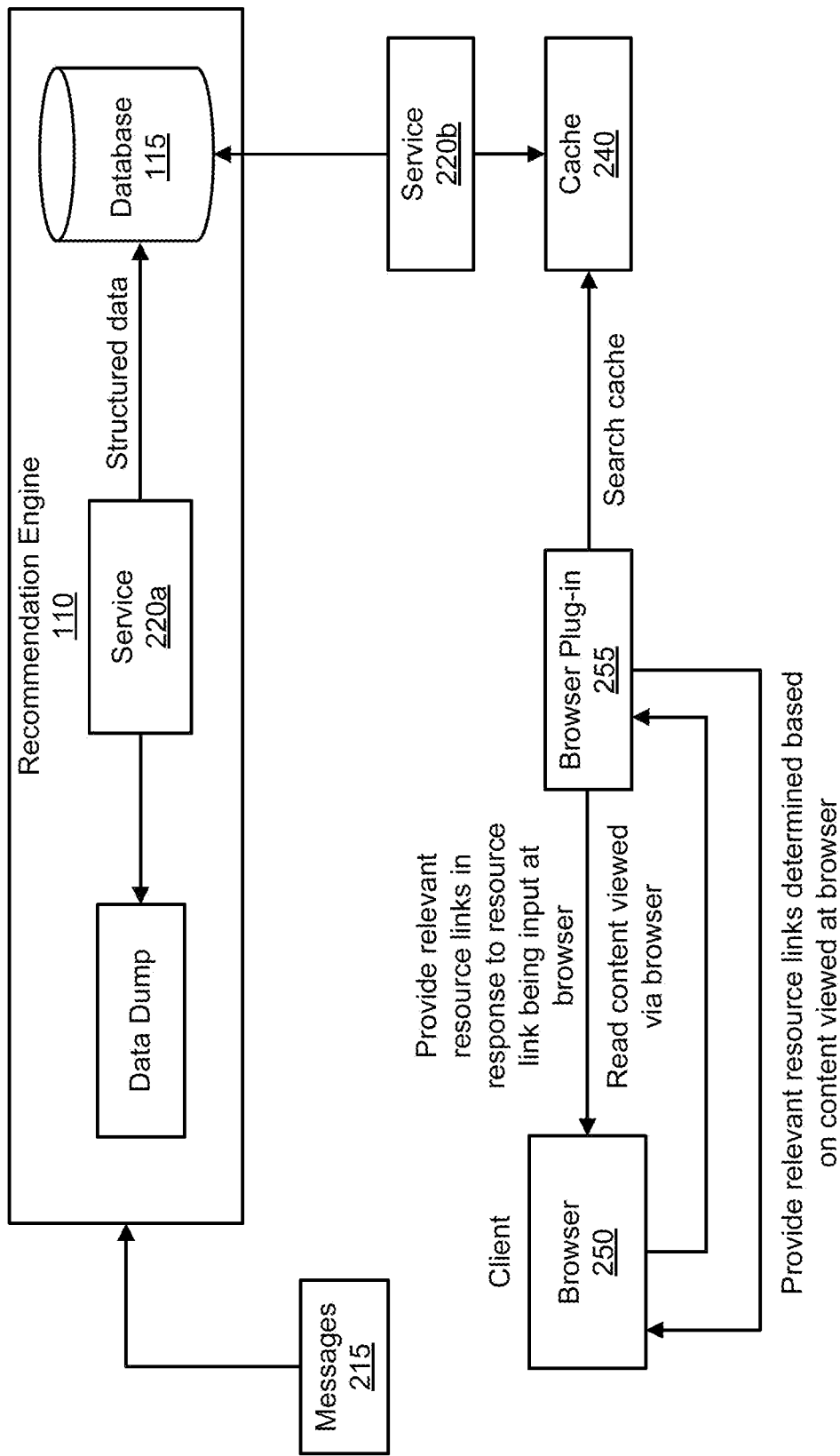
FIG. 2B depicts a block diagram illustrating another example of a flow of data through a resource link system, in accordance with some example embodiments.

To further illustrate, FIGS. 2A-B depict block diagrams illustrating examples of a flow of data through the resource link system 110, in accordance with some example embodiments. Referring to FIGS. 1 and 2A-B, the resource link engine 110, for example, an aggregator 210, may aggregate or otherwise collect one or more messages 215 from one or more communication services 130. The messages 215 being exchanged between various users including, for example, the first user 125a, the second user 125b, the third user 125c, and/or the like. Moreover, the resource link engine 110, for example, a first service 220a, may parse the messages 215 including by sorting, based on one or more of a time, a sender, a recipient, and a subject of each message, the messages 215 into one or more buckets (or groups) of messages. In doing so, the resource link engine 110 may sort the messages 215 chronologically such that a first bucket of messages may include messages from a first time period while a second bucket of messages may include messages from a second time period before (or after) the first time period. Alternatively and/or additionally, the resource link engine may sort the messages 215 according to groups of users such that a first bucket of messages may include messages exchanged between a first group of users while a second bucket of messages may include messages exchanged between a second group of users. Separating the messages 215 into different buckets of messages may generate structured data that enables the resource link engine 110 to identify more (or less) recent messages and/or messages exchanged amongst one or more groups of users.

Referring again to FIGS. 2A-B, the resource link engine 110, for example, the first service 220a, may analyze the messages 215 in order to identify relevant resource links such as, for example, resource links that are relevant to the first user 125a. For example, the resource link engine 110 may compute, for individual resource links included in the messages exchanged with the first user 125a and/or groups of users including the first user 125a, a score (e.g., a relevance score). Moreover, in some example embodiments, the resource link engine 110 may compute a first relevance score of the resource link for the first user 125a individually as well as a second relevance score of the resource link for one or more groups of users including the first user 125a. In doing so, the resource link engine 110 may identify resource links that are relevant to the first user 125a individually as well as resource links that are relevant to one or more groups of users that include the first user 125a.

Figure 3:
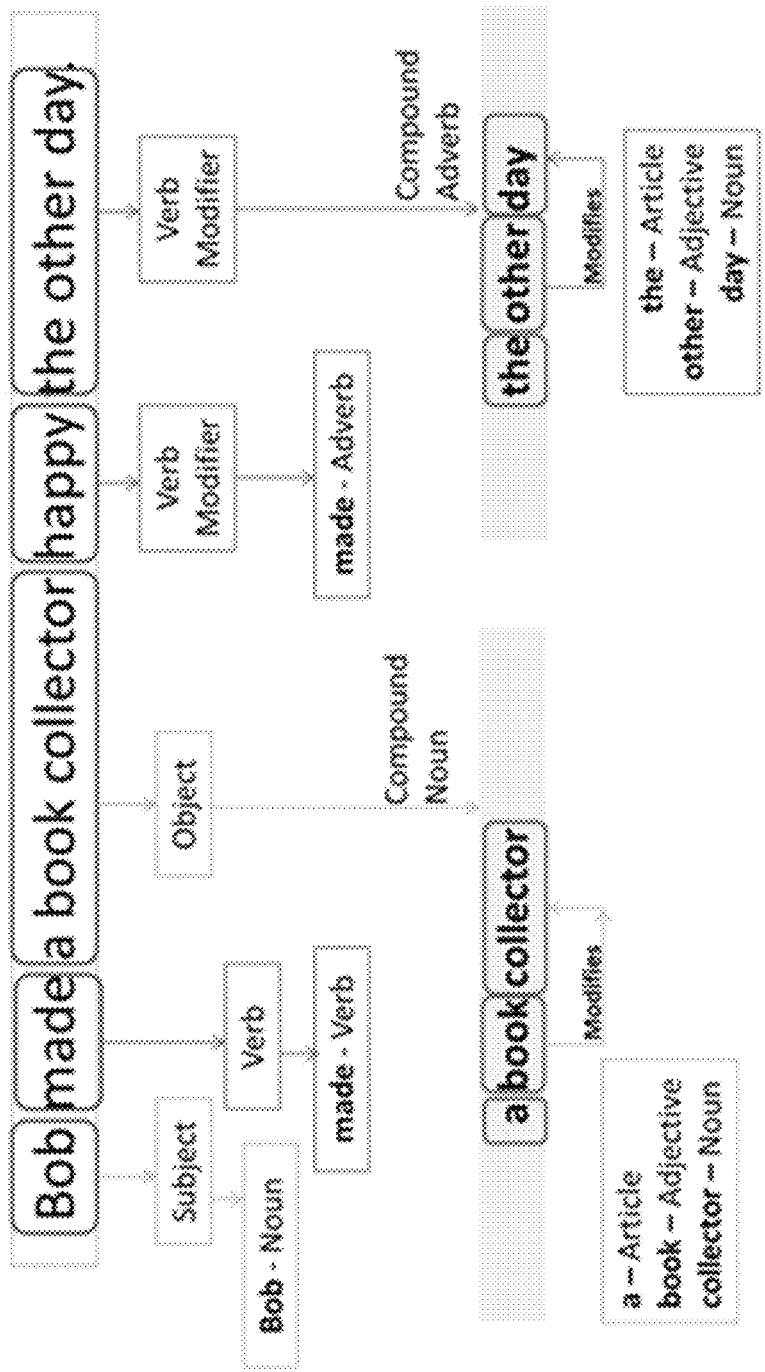
FIG. 3 depicts an example of parts-of-speech (POS) tagging, in accordance with some example embodiments.

In some example embodiments, the relevance score for a resource link may be computed based at least on a time of a message including the resource link such that the resource link may be associated with or otherwise be assigned a higher relevance score if the resource link appears in a more recent message and a lower relevance score if the resource link appears in a less recent message. Alternatively and/or additionally, the relevance score for a resource link may be computed based on a result of a semantic analysis, which the resource link engine 110 may perform on a message including the resource link to determine a tone, a sentiment, a topic, and/or an intent associated with the message. To further illustrate, FIG. 3 depicts an example of parts-of-speech (POS) tagging, a type of semantic analysis that may be performed to determine a subjectivity of a message. For example, adjectives and adverbs, such as "urgent" or "necessary," may convey the subjective point of view of the message. The resource link engine 110 may therefore be able to determine, based at least on the result of the parts-of-speech tagging, the tone of the message. The resource link included in the message may be associated with a higher relevance score if the tone of the message is more urgent and a lower relevance score if the tone of the message is less urgent.

Referring back to FIGS. 2A-B, the resource links that are relevant to the first user 125a may be identified based at least on the relevance scores of the resource links which, as noted, may include a first relevance score of the resource links for the first user 125a individually as well as a second relevance score of the resource link for one or more groups of users including the first user 125a. In some example embodiments, the resource link engine 110, for example, the first service 220a, may identify one or more resource links having a highest relevance score and/or a relevance score exceeding a threshold value as being relevant to the first user 125a. The resource link engine 110 may update a user profile 230 associated the first user 125a to include the resource links relevant to the first user 125a. The user profile 230 may be updated to include one or more relevant resource links, which may be sorted based on a respective relevance score of the resource links. As such, the resource link engine 110 may access the user profile 230 and provide, to the first client 120a and/or the fourth client 120d of the first user 125a, one or more of the resource links included in the resource profile 230.

As shown in FIGS. 2A-B, the user profile 230 may be stored at a database 115 coupled or otherwise in communication with the resource link engine 110. Storing the relevant resource links in a central location such as the database 115 may enable the resource link engine 110 to provide relevant resource links to multiple devices associated with the first user 125a. For example, the first client 120a and/or the fourth client 120d associated with the first user 125a may query the database 115 in order to retrieve at least a portion of the user profile 230 associated with the first user 125a. However, to expedite response time at individual devices, the resource link engine 110, for example, a second service 220b, may also update a cache 240 at the first client 120a and/or the fourth client 120d associated with the first user 125a to include at least some of the resource links that the resource link engine 110 identified as being relevant to the first user 125a.

Referring now to FIG. 2B, the resource link engine 110 may provide, to first client 120a and/or the fourth client 120d of the first user 125a, the resource links relevant to the first user 125a in response to the first user 125a interacting with a browser 250 at the first client 120a and/or the fourth client 120d. For example, the resource links that are relevant to the first user 125a may be displayed at the first client 120a and/or the fourth client 120d in response to the first user 125a interacting with the browser 250 to input a resource link. Alternatively and/or additionally, the resource links that are relevant to the first user 125a may be displayed at the first client 120a and/or the fourth client 120d in response to the first user 125a interacting with the browser 250 to view content (e.g., a webpage and/or the like). As noted, the resource links that are displayed while the first user 125a is viewing content may be further identified based on the content. For example, the resource link engine 110 may analyze at least a portion of the content being viewed at the browser 250 to identify one or more resource links that are relevant to the content.

In some example embodiments, at least some of the functionalities of the resource link engine 110 may be implemented, for example, at the first client 120a and/or the fourth client 120d, as part of a browser plug-in 255. While the first user 125a is interacting with an application (e.g., browser 250) at the first client 120a and/or the fourth client 120d, the browser plug-in 255 may be configured to access the cache 240 and/or the database 115 (e.g., the user profile 230 associated with the first user 125a) in order to retrieve one or more resource links relevant to the first user 125a. Alternatively and/or additionally, the retrieval of relevant resource links may be implemented using browser virtual applications, by interacting with the native programming code of the browser 250, and/or be integrated into the source code of the browser 250. For example, the resource link engine 110 may make one or more calls (e.g., URLRequest, URLRequestContext, and/or the like) to the browser 250 in order to trigger the retrieval and/or display of relevant resource links.

Figure 4:
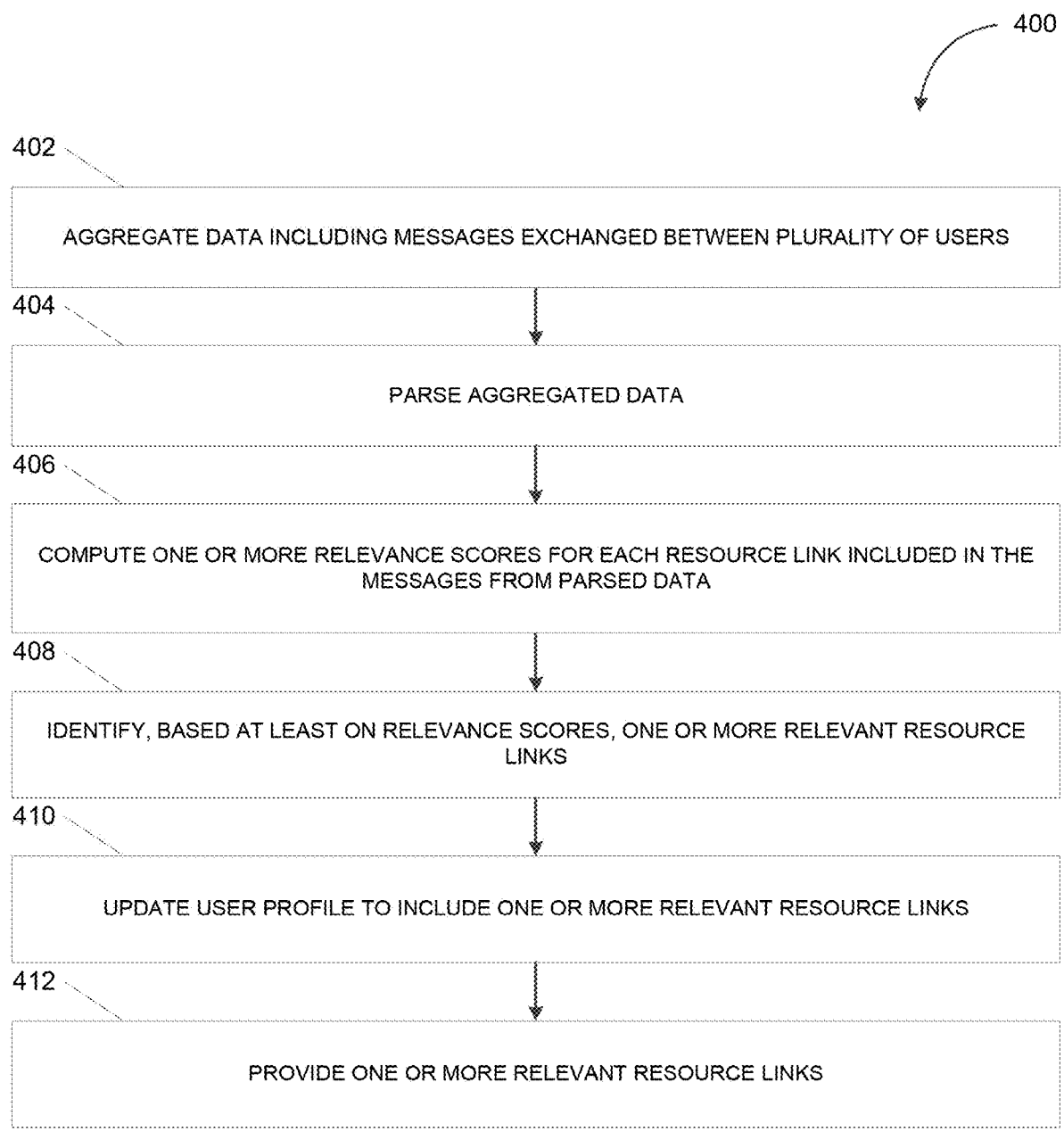
FIG. 4 depicts a flowchart illustrating an example of a process for providing relevant resource links, in accordance with some example embodiments.

FIG. 4 depicts a flowchart illustrating an example of a process 400 for providing relevant resource links, in accordance with some example embodiments. Referring to FIGS. 1, 2A-B, and 3-4, the process 400 may be performed by the resource link engine 110. For example, the resource link engine 110 may perform the process 400 in order to identify, for provision to the first client 120a and/or the fourth client 120d of the first user 125a, one or more resource links relevant to the first user 125a. Resource links that are relevant to the first user 125a may appear in correspondences associated with the first user 125a, which may include one or more messages exchanged with the first user 125a as well as groups of users including the first user 125a.

At 402, the resource link engine 110 may aggregate data including messages exchanged between a plurality of users. For example, as shown in FIG. 1, the first user 125a, the second user 125*b*, and the third user 125*c* may communicate via the one or more communication services 130, which may include an email server, an instant message service, an issue tracking system, and/or the like. The resource link engine 110, for example, the aggregator 210, may aggregate the messages 215 exchanged between the first user 125*a*, the second user 125*b*, and/or the third user 125*c* by interacting with the one or more communication services 130 via one or more application programing interface (API) calls, web hooks, and/or the like. Alternatively and/or additionally, the one or more communication services 130 may publish and/or push the messages for aggregation by the resource link engine 110.

At 404, the resource link engine 110 may parse the aggregated data. For example, the resource link engine 110, for example, the first service 220*a*, may parse the messages 215 including by sorting, based on one or more of a time, a sender, a recipient, and a subject of each message, the messages 215 into one or more buckets of messages. The parsing of the messages 215 may include sorting the messages 215 chronologically such that a first bucket of messages may include messages from a first time period while a second bucket of messages may include messages from a second time period before (or after) the first time period. Alternatively and/or additionally, the parsing of the messages 215 may include sorting the messages 215 according to groups of users such that a first bucket of messages may include messages exchanged between a first group of users while a second bucket of messages may include messages exchanged between a second group of users.

As noted, the resource link engine 110 may separate the messages 215 into different buckets of messages in order to generate structured data that enables the resource link engine 110 to readily identify more (or less) recent messages and/or messages exchanged amongst a group of users. By sorting the messages 215 chronologically into the buckets of messages that each correspond to a different time period, the resource link engine 110 may readily identify more (or less) recent messages by accessing the corresponding buckets. For example, instead of analyzing each message individually to identify more recent messages, the resource link engine 110 may identify more recent messages by accessing the buckets containing messages from more recent time periods.

At 406, the resource link engine 110 may compute one or more relevance scores for individual resource links included the messages from the parsed data. In some example embodiments, the resource link engine 110 may compute, based at least on a time of a message including a resource link, a relevance score for the resource link. As such, a resource link may be associated with a higher relevance score if the resource link appears in a more recent message of a conversation (or message exchange) and a lower relevance score if the resource link appears in a less recent message. Alternatively and/or additionally, the resource link engine 110 may compute, based on a result of a semantic analysis performed on a message including a resource link, a relevance score for the resource link. For example, the resource link engine 110 may perform a parts-of-speech (POS) tagging in order to determine a tone, a sentiment, a topic, and/or an intent associated with a message. A resource link may be associated with a higher relevance score if the resource link appears in a more urgent message and a lower relevance score if the resource link appears in a less urgent message.

At 408, the resource link engine 110 may identify one or more relevant resource links. For example, the resource link engine 110, for example, the first service 220*a*, may identify one or more resource links having a highest relevance score based on a comparison of scores for messages of the conversation. Alternatively, the resource link engine 110 may identify resource links of messages that have a relevance score that exceeds a threshold value. As noted, a resource link may be associated with a first relevance score for the first user 125*a* individually as well as a second relevance score for one or more groups of users including the first user 125*a*. Accordingly, even when the first relevance score indicates that the resource link is not relevant to the first user 125*a* individually, the resource link engine 110 may nevertheless determine, based at least on the second relevance score, that the resource link is relevant to a group of users including the first user 125*a*.

At 410, the resource link engine 110 may update a user profile to include the one or more relevant resource links. For example, the resource link engine 110 may update the user profile 230 associated the first user 125*a* to include the resource links relevant to the first user 125*a* and/or groups of users including the first user 125*a*. The user profile 230 may be updated to include one or more relevant resource links, which may be sorted based on a respective relevance score of the resource links. As such, the resource link engine 110 may access the user profile 230 in order to identify one or more the resource links relevant to the first user 125*a*. Moreover, as shown in FIGS. 2A-B, the user profile 230 may be stored at a centralized location, such as the database 115 coupled with the resource link engine 110, such that the resource link engine 110 is able to provide the relevant resource links to multiple devices associated with the first user 125*a* including, for example, the first client 120*a*, the fourth client 120*d*, and/or the like. To expedite response time at individual devices, the resource link engine 110, for example, the second service 220*b*, may update a cache 240 at the first client 120*a* and/or the fourth client 120*d* associated with the first user 125*a* to include at least some of the resource links that the resource link engine 110 identified as being relevant to the first user 125*a*.

At 412, the resource link engine 110 may provide the one or more relevant resource links. In some example embodiments, the resource link engine 110 may provide, to the first client 120*a* and/or the fourth client 120*d* of the first user 125*a*, the resource links relevant to the first user 125*a* in response to the first user 125*a* interacting with the browser 250 at the first client 120*a* and/or the fourth client 120*d*. For example, the resource links that are relevant to the first user 125*a* may be displayed at the first client 120*a* and/or the fourth client 120*d* in response to the first user 125*a* interacting with the browser 250 at the first client 120*a* and/or the fourth client 120*d* to input a resource link. Alternatively and/or additionally, the resource links that are relevant to the first user 125*a* may be displayed at the first client 120*a* and/or the fourth client 120*d* in response to the first user 125*a* interacting with the browser 250 to view content (e.g., a webpage and/or the like). As noted, the resource links that are displayed while the first user 125*a* is viewing content may be further identified based on the content.

Figure 5A:
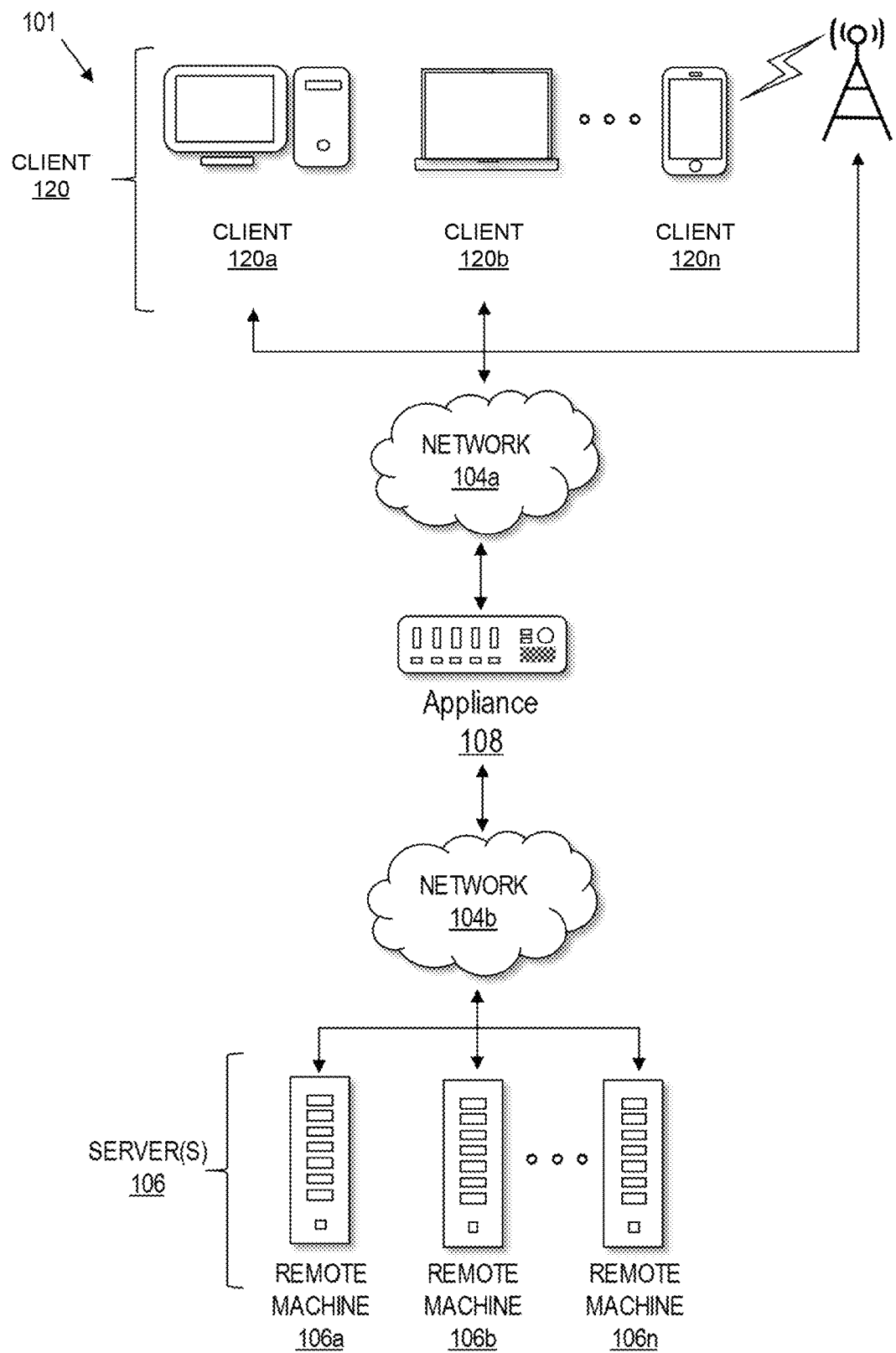
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more clients 120*a*-120*n*, one or more remote machines 106*a*-106*n*, one or more networks 104*a* and 104*b*, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. The clients 120a-120n may include, for example, the first client 120a, the second client 120b, the third client 120c, the fourth client 120d, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource link engine 110, the one or more communication services 130, and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine providing, to a user of a client 120, access to a computing environment. The client 120 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
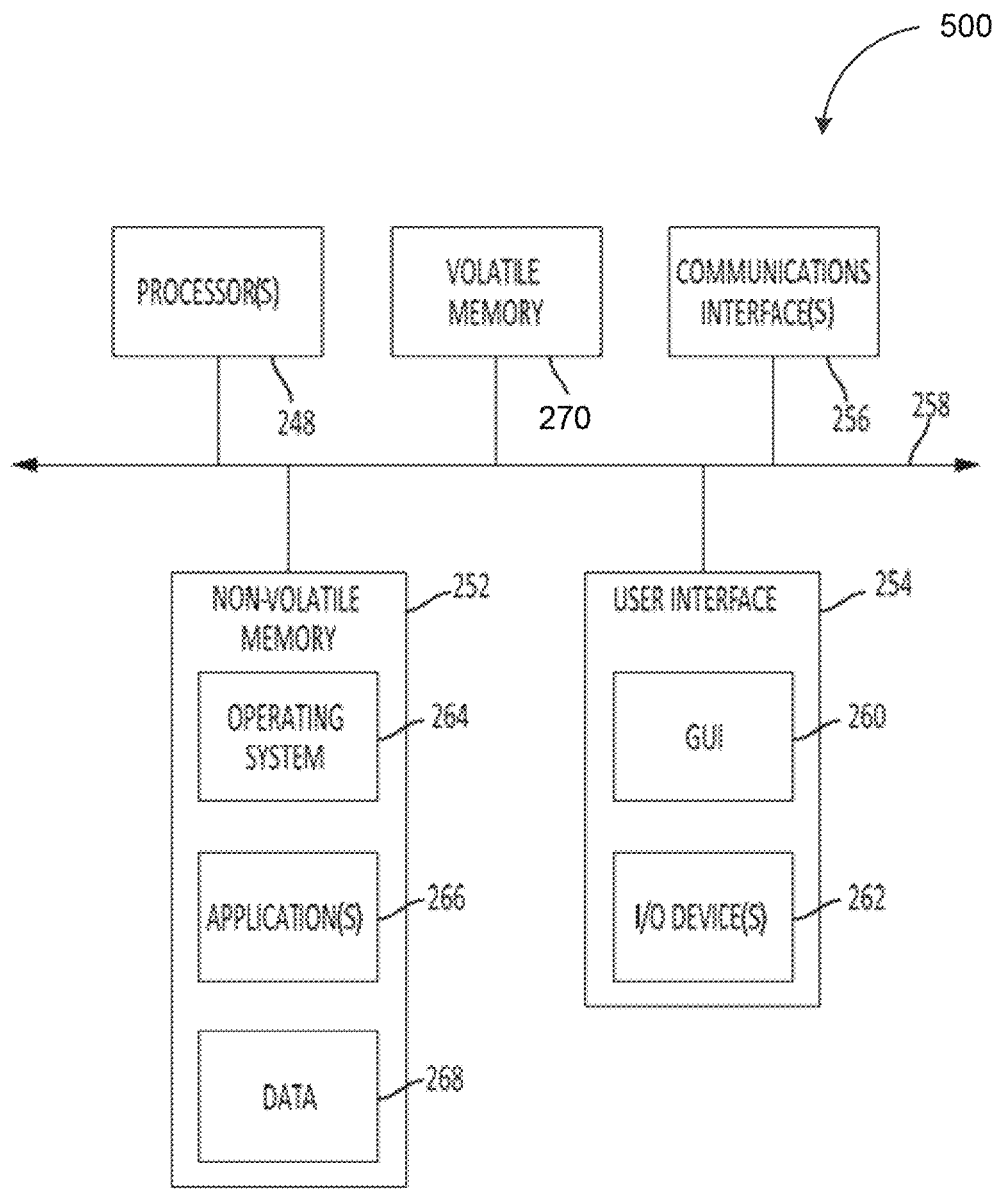
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the first client 120a, the second client 120b, the third client 120c, the fourth client 120d, the resource link engine 110, and/or the one or more communication services 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the first client 120a, the second client 120b, the third client 120c, the fourth client 120d, the resource link engine 110, and/or the one or more communication services 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
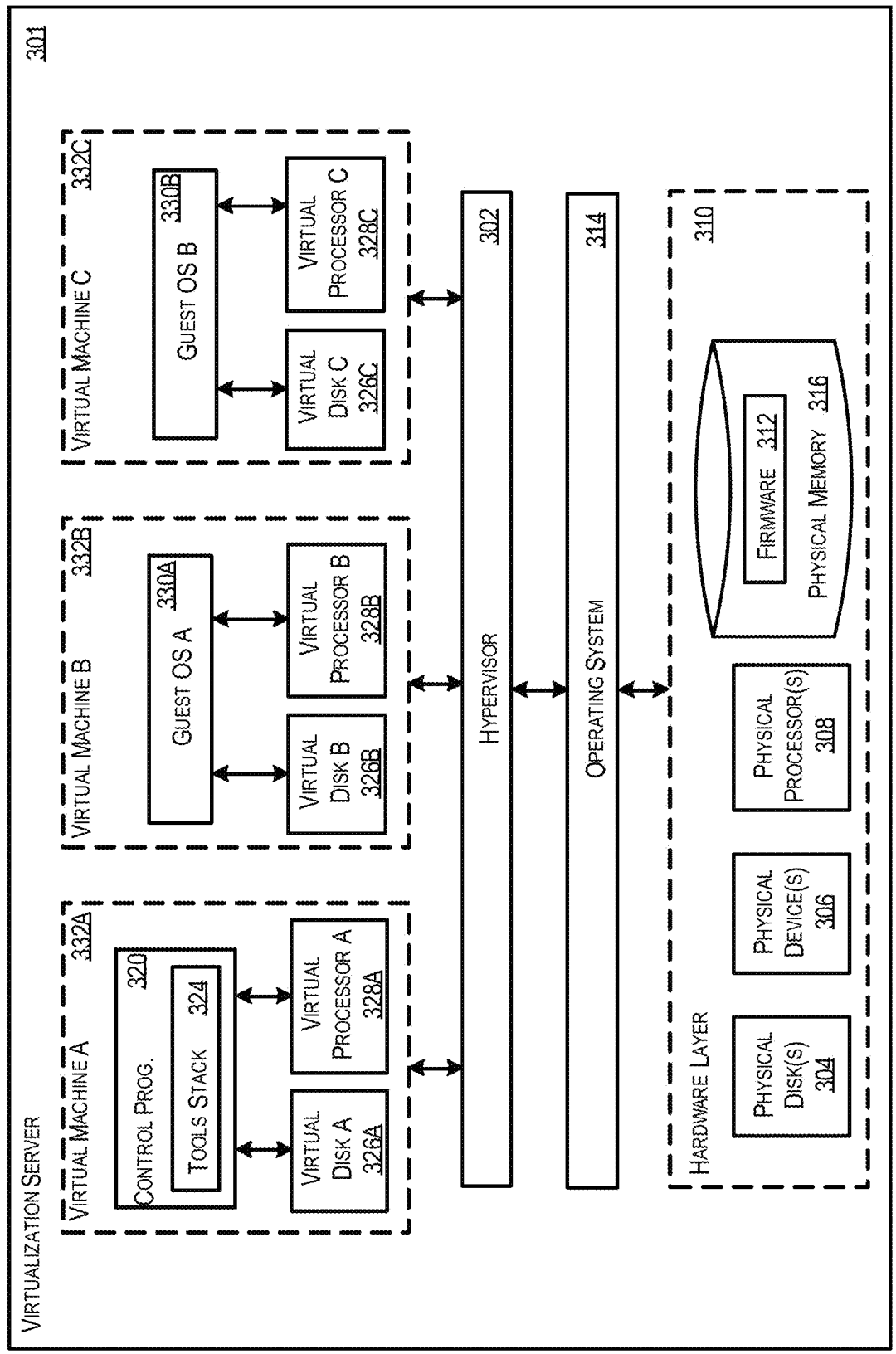
FIG. 5C depicts a high-level architecture of an example of a virtualization system for implementing a cloud computing system, in accordance with some example embodiments.

FIG. 5C depicts a high-level architecture of an example of a virtualization system for implementing the cloud computing system 100, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, cause the at least one data processor to at least:
   aggregate, from one or more communication services, data including a plurality of messages exchanged between a plurality of users including a first user and a second user;
   compute, for a first link to a first resource included in a first message exchanged between the first user and the second user, a first relevance score of the first link for the first user;
   identify, based at least on the first relevance score, the first link as one or more links relevant to the first user, the first link being identified as relevant to the first user based at least on the first relevance score indicating that the first message including the first link is more recent and/or urgent than a second message including a second link to a second resource; and
   in response to detecting the first user interacting with a browser at a first device to input a link to a resource, provide, for display at the first device, the one or more links relevant to the first user instead of and/or in addition to one or more links included in a browsing history of the first user.

2. The system of claim 1, wherein the at least one data processor is further caused to at least:
   compute, for a third link to a third resource included in a third message exchanged with a third user, a third relevance score of the third link for a group of users including the first user and the third user; and
   identify, based at least on the third relevance core, the third link as the one or more links relevant to the first user.

3. The system of claim 2, wherein the first user and the third user are determined to belong to a same group of users based on one or more common attributes including an interest, a project, a job title, and/or an organizational assignment.

4. The system of claim 1, wherein the at least one data processor is further caused to at least:
   sort, based at least on a time, a sender, a recipient, and/or a sender, the plurality of messages into one or more buckets of messages.

5. The system of claim 1, wherein the first relevance score of the first link is computed based at least on a time of the first message including the first link.

6. The system of claim 1, wherein the at least one data processor is further caused to at least:
   perform a natural language processing to at least determine a tone, a sentiment, a topic, and/or an intent of the first message, and
   compute, based at least on a result of the natural language processing, the first relevance score of the first link included in the first message.

7. The system of claim 6, wherein the natural language processing includes a parts-of-speech tagging to determine an urgency of the first message.

8. The system of claim 1, wherein the at least one data processor is further caused to at least:
   update, based at least on the first relevance score of the first link and the second relevance score of the second link, a profile of the first user to include the first link as being more relevant to the first user than the second link; and
   access the profile of the first user in order to identify the one or more links relevant to the first user.

9. The system of claim 8, wherein the profile of the first user is stored at a database accessible to the first device and a second device associated with the first user.

10. The system of claim 9, wherein at least a portion of the profile retrieved from the database is cached at the first device, and wherein the one or more links relevant to the first user is identified based at least on the portion of the profile cached at the first device.

11. The system of claim 1, wherein the one or more links relevant to the first user are provided for display at the first device in response to the first user interacting with the browser at the first device to view a content, and wherein the one or more links relevant to the first user arge further identified based at least on the content.

12. The system of claim 1, wherein the first link comprises a hyperlink and/or a network path.

13. The system of claim 1, wherein the plurality of messages include one or more emails, instant messages, and/or issue tracking tickets.

14. A system, comprising:
    at least one data processor; and
    at least one memory storing instructions which, when executed by the at least one data processor, cause the at least one data processor to at least:
    compute a score for a link to a resource, the link being included in an exchange of messages that forms a conversation between a plurality of users of an application, and computation of the score including grouping of messages that occur before or after the link within the conversation to determine a portion of the conversation for which the link belongs;
    determine, based at least on the computed score, that the link is a part of a more recent portion of the conversation than another link; and
    in response to detecting a user of the plurality of users interacting with a browser at a client device to input a link to a resource, provide, for display at the client device, the link instead of and/or in addition to one or more links included in a browsing history of the user, the link being provided to avoid delays with search of the messages of the conversation to located the link and access the resource.

15. A computer-implemented method, comprising:

aggregating, from one or more communication services, data including a plurality of messages exchanged between a plurality of users including a first user and a second user;

computing, for a first link to a first resource included in a first message exchanged between the first user and the second user, a first relevance score of the first link for the first user;

identifying, based at least on the first relevance score, the first link as one or more links relevant to the first user, the first link being identified as relevant to the first user based at least on the first relevance score indicating that the first message including the first link is more recent and/or urgent than a second message including a second link to a second resource; and in response to detecting the first user interacting with a browser at a first device to input a link to a resource, providing, for display at the first device, the one or more links relevant to the first user instead of and/or in addition to one or more links included in a browsing history of the first user.

16. The method of claim 15, further comprising:

computing, for a third link to a third resource included in a third message exchanged with a third user, a third relevance score of the third link for a group of users including the first user and the third user, the first user and the third user belonging to a same group of users based on one or more common attributes including an interest, a project, a job title, and/or an organizational assignment; and identifying, based at least on the third relevance core, the third link as the one or more links relevant to the first user.

17. The method of claim 15, further comprising:

sorting, based at least on a time, a sender, a recipient, and/or a sender, the plurality of messages into one or more buckets of messages.

18. The method of claim 15, wherein the first relevance score of the first link is computed based at least on a time of the first message including the first link.

19. The method of claim 15, further comprising:

performing a natural language processing to at least determine a tone, a sentiment, a topic, and/or an intent of the first message, and computing, based at least on a result of the natural language processing, the first relevance score of the first link included in the first message.

20. An apparatus, comprising:

means for aggregating, from one or more communication services, data including a plurality of messages exchanged between a plurality of users including a first user and a second user;

means for computing, for a first link to a first resource included in a first message exchanged between the first user and the second user, a first relevance score of the first link for the first user;

means for identifying, based at least on the first relevance score, the first link as one or more links relevant to the first user, the first link being identified as relevant to the first user based at least on the first relevance score indicating that the first message including the first link is more recent and/or urgent than a second message including a second link to a second resource; and means for responding to detecting the first user interacting with a browser at a first device to input a link to a resource by at least providing, for display at the first device, the one or more links relevant to the first user instead of and/or in addition to one or more links included in a browsing history of the first user.

\* \* \* \* \*